UNITED STATES PATENT OFFICE.

JAKOB SCHMID AND ROBERT PAGANINI, OF BASLE, SWITZERLAND, ASSIGNOR TO THE SOCIETY OF CHEMICAL INDUSTRY IN BASLE, OF SAME PLACE.

MONOSULPHO-DIOXYNAPHTHOIC ACID.

SPECIFICATION forming part of Letters Patent No. 493,562, dated March 14, 1893.

Application filed August 26, 1892. Serial No. 444,103. (Specimens.) Patented in France March 4, 1892, No. 219,875.

*To all whom it may concern:*

Be it known that we, JAKOB SCHMID and ROBERT PAGANINI, citizens of Switzerland, residing at Basle, Switzerland, have invented new and useful Improvements in the Production of Dioxynaphthoic-Monosulphonic Acid, which may be usefully employed as a material for the production of monosulpho-dioxynaphthoic acid, (for which we have received Letters Patent in France, No. 219,875, dated March 4, 1892,) of which the following is a specification.

Our invention relates to the production of the mono-sulpho-dioxy-naphthoic acid. Beta-naphtol-carbon acid of the melting point of 216° centigrade (German patent No. 50,341 of June 1, 1889) can be easily converted into di-sulpho-beta-oxy-naphthoic acid. In heating this latter with caustic alkalies and in substituting for one of the sulpho-groups, the hydroxyl-group, it is transformed into a new acid; videlicet, mono-sulpho-dioxy-naphthoic acid.

In carrying out our invention practically we proceed as follows (the parts are by weight): Ten parts of beta-naphthol-carbon acid of the melting point of 216° centigrade are introduced into forty parts of fuming sulphuric acid of twenty-four per cent. anhydride at a temperature of 100° to 120° centigrade. After heating at a temperature of from 100° to 160° centigrade during two to three hours the reaction is completed. The product of the sulphonation is poured into water saturated with lime, the liquid filtered off from gypsum and then is prepared in the usual way, by addition of soda, the soda-salt of di-sulpho-beta-oxy-naphthoic acid which separates as a faint yellow crystalline mass by concentration of the aqueous solution.

To convert di-sulpho-beta-oxy-naphthoic acid into mono-sulpho-dioxy-naphthoic acid: Twenty parts of the sodium salt of di-sulpho-beta-oxy-naphthoic acid are heated with forty parts of caustic soda and ten parts of water during two to three hours at from 210° to 220° centigrade and finally at from 230° to 240° centigrade. The reaction takes place in a short time and is completed as soon as the melt solidifies. Its duration varies according to the quantity of caustic soda or of hydrate of potash employed and the degree of temperature of the reaction.

The above described process can be carried out in a closed vessel under pressure or in an open one. In the first case the quantity of caustic alkali may be reduced without injury for the result. The melt is introduced into warm dilute muriatic acid or sulphuric acid.

The acid sodium-salt of the mono-sulpho-dioxy-naphthoic acid having in a dried state the constitution:

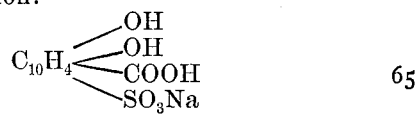

separates in small light-yellowish needles. It is obtained pure by filtering and crystallizing from its aqueous solution. It dissolves difficultly in cold water and alcohol, easily in warm water and crystallizes therefrom in flat prisms. It is insoluble in benzine. The neutral sodium-salt crystallizes from the aqueous solution in needles ranging in rosettes. By addition of chloride of barium to the warm and saturated solution of the acid sodium-salt, the acid barium salt, which is difficultly soluble in cold water, separates in needles.

In decomposing the barium-salt by sulphuric acid, mono-sulpho-dioxy-naphthoic acid of the formula:

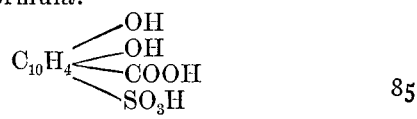

is obtained. It crystallizes from dilute muriatic acid in long faint-yellow needles which dissolve easily in water. The aqueous solutions of the alkaline salts of mono-sulpho-dioxy-naphthoic acid have a yellow-green fluorescence and show a dark indigo-blue coloration by addition of perchloride of iron and an intense yellow-orange coloration by addition of chloride of lime.

The mono-sulpho-dioxy-naphthoic acid is employed for the production of coloring matters.

What we claim as new, and desire to secure by Letters Patent, is—

1. The process for producing mono-sulpho-dioxy-naphthoic acid or its salts which consists in heating the sodium salt of di-sulpho-beta-oxy-naphthoic acid as herein described with caustic alkalies at a temperature of from 200° to 260° centigrade and then precipitating the dissolved melt with hydrochloric acid or sulphuric acid, substantially as described.

2. As a new product the mono-sulpho-dioxy-naphthoic acid of the formula:

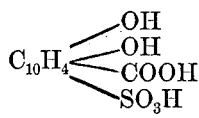

which crystallizes from dilute muriatic acid in long faint needles easily soluble in cold water, and the aqueous solutions of its alkaline salts have a yellow green fluorescence showing a dark indigo-blue coloration by addition of perchloride of iron and an intense yellow coloration by addition of chloride of lime.

In testimony whereof we have hereunto set our hands in the presence of two subscribing witnesses.

JAKOB SCHMID.
ROBERT PAGANINI.

Witnesses:
GEORGE GIFFORD,
F. WALTER.